(12) United States Patent
He et al.

(10) Patent No.: US 9,736,029 B2
(45) Date of Patent: Aug. 15, 2017

(54) DEVICE AND A METHOD FOR MANAGING ACCESS TO A POOL OF COMPUTER AND NETWORK RESOURCES MADE AVAILABLE TO AN ENTITY BY A CLOUD COMPUTING SYSTEM

(71) Applicant: Orange, Paris (FR)

(72) Inventors: Ruan He, Issy les Moulineaux (FR); Jacques Lebourgeois, Paris (FR); Julien Terrier, Bordeaux (FR)

(73) Assignee: ORANGE, Paris (FR)

( * ) Notice: Subject to any disclaimer, the term of this patent is extended or adjusted under 35 U.S.C. 154(b) by 133 days.

(21) Appl. No.: 14/431,638

(22) PCT Filed: Sep. 23, 2013

(86) PCT No.: PCT/FR2013/052207
§ 371 (c)(1),
(2) Date: Mar. 26, 2015

(87) PCT Pub. No.: WO2014/049251
PCT Pub. Date: Apr. 3, 2014

(65) Prior Publication Data
US 2015/0263902 A1    Sep. 17, 2015

(30) Foreign Application Priority Data

Sep. 27, 2012  (FR) ..................... 12 59122

(51) Int. Cl.
*H04L 12/24* (2006.01)
*G06F 9/50* (2006.01)
(Continued)

(52) U.S. Cl.
CPC .......... *H04L 41/145* (2013.01); *G06F 9/5072* (2013.01); *G06F 21/6218* (2013.01); *H04L 47/781* (2013.01)

(58) Field of Classification Search
None
See application file for complete search history.

(56) References Cited

U.S. PATENT DOCUMENTS 9,124,633 B1 *  9/2015  Eizadi ................... H04L 61/20
9,148,408 B1 *  9/2015  Glazemakers ........ H04L 63/029
(Continued)

OTHER PUBLICATIONS

Bensaidi et al. Apr. 21, 2012. Politique de controle d'accès au Cloud Computing: Recommandation à base de confiance. Journées nationales de la Sécurite des Réseaux et Systèmes. Retrieved from the Internet on Jun. 4, 2013: URL: http://ieeexplore.ieee.org/ielx5/6241681/6249222/06249249.pdf?tp=&arnumber=6249249&isnumber=6249222, 7 pages.
(Continued)

*Primary Examiner* — Ninos Donabed
(74) *Attorney, Agent, or Firm* — Knobbe, Martens, Olson & Bear, LLP

(57) ABSTRACT

Disclosed is a method comprising updating a first model describing a pool of computer and network resources and a second multi-level hierarchical model describing an entity, each level having at least one element containing one or more users of the entity and associated with an algorithm for allocating at least a portion of the pool, the union of the elements at any level containing all of the users, such that the first and second models represent a current state of the pool of resources and a current state of the entity.

Upon request from a user to access a resource specified in the request, resources may be identified by applying the algorithms of the second model to the current state of the pool represented by the first model, verifying compatibility between the identified resources and the resource specified in the request, and rejecting the request in the event of incompatibility.

12 Claims, 4 Drawing Sheets

(51) Int. Cl.
*G06F 21/62* (2013.01)
*H04L 12/911* (2013.01)

(56) References Cited

U.S. PATENT DOCUMENTS

| | | | | |
|---|---|---|---|---|
| 9,369,433 | B1* | 6/2016 | Paul | H04L 63/0227 |
| 9,430,295 | B1* | 8/2016 | Eizadi | G06F 9/45558 |
| 2003/0105810 | A1* | 6/2003 | McCrory | H04L 29/06 |
| | | | | 709/203 |
| 2010/0132016 | A1* | 5/2010 | Ferris | G06F 21/6218 |
| | | | | 726/4 |
| 2010/0318642 | A1* | 12/2010 | Dozier | H04L 12/66 |
| | | | | 709/223 |
| 2011/0125894 | A1* | 5/2011 | Anderson | H04L 9/3213 |
| | | | | 709/224 |
| 2011/0125895 | A1* | 5/2011 | Anderson | H04L 9/3213 |
| | | | | 709/224 |
| 2011/0126047 | A1* | 5/2011 | Anderson | H04L 9/3213 |
| | | | | 714/15 |
| 2011/0126099 | A1* | 5/2011 | Anderson | H04L 9/3213 |
| | | | | 715/704 |
| 2011/0126197 | A1* | 5/2011 | Larsen | H04L 9/3213 |
| | | | | 718/1 |
| 2011/0126207 | A1* | 5/2011 | Wipfel | H04L 9/3213 |
| | | | | 718/104 |
| 2011/0126275 | A1* | 5/2011 | Anderson | H04L 9/3213 |
| | | | | 726/8 |
| 2011/0271270 | A1* | 11/2011 | Bowen | G06F 8/67 |
| | | | | 717/171 |
| 2012/0066487 | A1* | 3/2012 | Brown | G06F 9/5083 |
| | | | | 713/150 |
| 2012/0102539 | A1* | 4/2012 | Robb | G06F 21/6218 |
| | | | | 726/1 |
| 2012/0130936 | A1* | 5/2012 | Brown | G06N 5/048 |
| | | | | 706/52 |
| 2012/0310824 | A1* | 12/2012 | Liberty | G06Q 40/02 |
| | | | | 705/40 |
| 2012/0323777 | A1* | 12/2012 | Liberty | G06Q 20/223 |
| | | | | 705/41 |
| 2012/0330737 | A1* | 12/2012 | Liberty | G06Q 30/0208 |
| | | | | 705/14.17 |
| 2013/0031559 | A1* | 1/2013 | Alicherry | G06F 9/5077 |
| | | | | 718/104 |
| 2013/0067564 | A1* | 3/2013 | Fok Ah Chuen | G06F 21/6218 |
| | | | | 726/17 |
| 2013/0132219 | A1* | 5/2013 | Liberty | G06Q 20/202 |
| | | | | 705/21 |
| 2013/0232463 | A1* | 9/2013 | Nagaraja | G06F 8/61 |
| | | | | 717/101 |
| 2013/0232480 | A1* | 9/2013 | Winterfeldt | G06F 8/60 |
| | | | | 717/177 |
| 2013/0232497 | A1* | 9/2013 | Jalagam | G06F 9/5072 |
| | | | | 718/104 |
| 2013/0232498 | A1* | 9/2013 | Mangtani | G06F 9/5072 |
| | | | | 718/104 |

OTHER PUBLICATIONS

El Kalam et al. Jun. 6, 2003. Organization based access control. Policy '03 Proceedings of the 4th IEEE International Workshop on Policies for Distributed Systems and Networks. Retrieved from the Internet: URL:http://ieeexplore.ieee.org/ielx5/8577/27164/01206966.pdf?tp=arnumber=12069668isnumber=27164, 12 pages.

International Telecommunication Union, Telecommunication Standardization Sector of ITU (ITU-T). Feb. 1, 2012. FG Cloud TR, Version 1.0, Focus Group on Cloud Computing Technical Report, Part 1: Introduction to the cloud ecosystem: Definitions, taxonomies, use cases and high-level requirements, 70 pages.

Mon et al. Oct. 28, 2011. The privacy-aware access control system using attribute-and role-based access control in private cloud. 2011 4th IEEE International Conference on Broadband Network and Multimedia Technology (IC-BNMT), pp. 447-451.

Sandhu, R. S. Feb. 1, 1996. Role-based access control models. IEEE Computer, 29(2):38-47.

International Search Report mailed Dec. 13, 2013 for International Application No. PCT/FR2013/052207 filed Sep. 23, 2013, 12 pages.

* cited by examiner

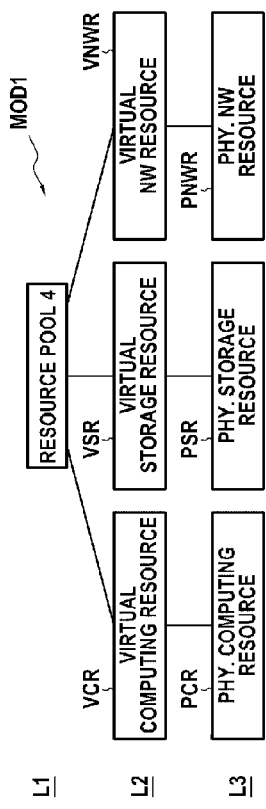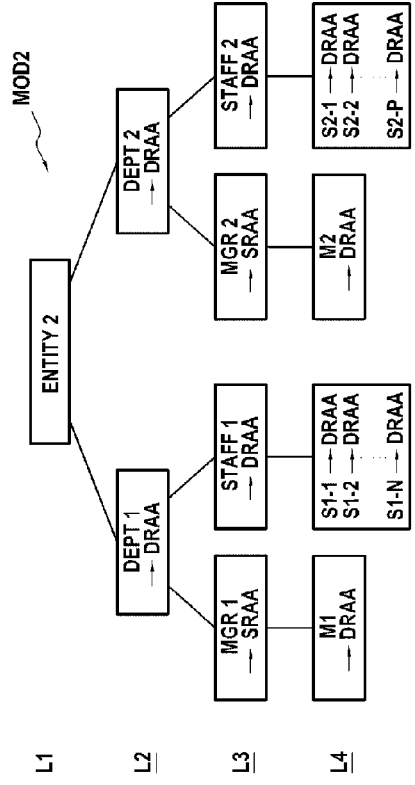
FIG.3A
FIG.3B

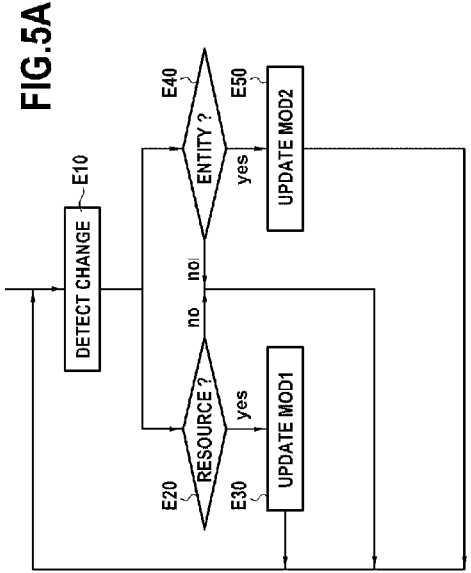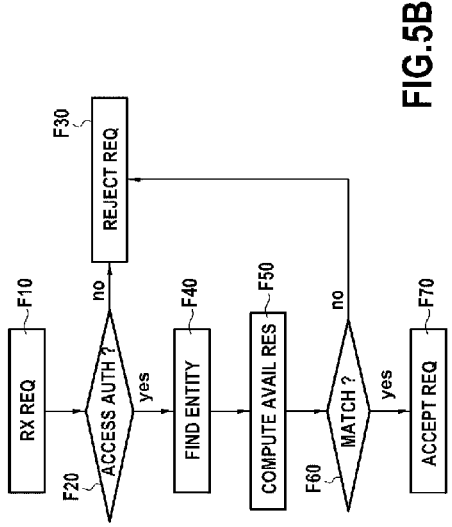

DEVICE AND A METHOD FOR MANAGING ACCESS TO A POOL OF COMPUTER AND NETWORK RESOURCES MADE AVAILABLE TO AN ENTITY BY A CLOUD COMPUTING SYSTEM

RELATED APPLICATIONS

This application is the U.S. National Phase of Application No. PCT/FR2013/052207 entitled "DEVICE AND METHOD FOR MANAGING ACCESS TO A SET OF COMPUTER RESOURCES AND NETWORKS IN A CLOUD COMPUTING SYSTEM" filed Sep. 23, 2013, which designated the United States, and which claims the benefit of French Application No. 1259122 filed Sep. 27, 2012.

BACKGROUND OF THE INVENTION

The invention relates to the general field of telecommunications, and in particular to so-called "cloud" computing systems.

The invention relates particularly to the user of an entity, such as a business, accessing computer networks and resources made available to that entity by a cloud computing system.

According to the definition given by the National Institute of Standards and Technology (NIST), "cloud computing" is a model enabling users to have self-service access on demand via a network to computer and network resources such as storage space, computation power, applications, software, or indeed services, which are virtualized (i.e. made virtual) and pooled (i.e. shared).

In other words, the computer services and networks are no longer on a local server of an entity or on a user station, but in accordance with the concept of cloud computing they are "dematerialized" in a "cloud" made up of a plurality of mutually interconnectable remote servers that are accessible by users, e.g. via a network application. Users can thus have access to these resources in a manner that varies over time, but without any need to manage the underlying infrastructure for managing the resources, which infrastructure is often complex.

The concept of "cloud computing" is described in greater detail in the document published by the International Telecommunication Union (ITU) entitled "FG cloud TR, version 1.0—part 1: Introduction to the cloud ecosystem: definitions, taxonomies, use cases and high-level requirements", February 2012.

In known manner, cloud computing benefits from numerous advantages:
- flexibility and diversity of resources that are pooled and practically unlimited;
- scalability of the resources that are provided on demand;
- simple and automatic administration of computer infrastructures and business networks, associated with reduced administration costs; and
- etc.

The major challenge of cloud computing nevertheless remains guaranteeing secure and protected access to resources.

Converting from a traditional computer environment that is secure and closed to an infrastructure in a cloud that is open and pooled, over which the user or the business has no control, and which is accessible via a telecommunications network such as the public Internet, which is particularly vulnerable and is continuously being subjected to computer piracy and attacks, naturally gives rise to security concerns with potential users.

Access control thus appears nowadays to the ITU as constituting the fundamental means for securing access to cloud computer systems.

Numerous mechanisms already exist in the state of the art for controlling (and making secure) access to a computer system (or in equivalent manner to an information system) for entities or organizations such as businesses.

These mechanisms are based essentially on two elements, namely:
- defining a policy in terms of access rights and formulated using a subject-object-action approach, i.e. such-and-such a subject does or does not have permission to perform such-and-such an action on such-and-such an object; and
- implementing this policy on receiving a request from a user seeking to access resources made available by the computer system, by verifying the user's rights to access the resources.

By way of example, such mechanisms are the role-based access control (RBAC) model and the organization-based access control (OrBAC) model as described respectively in the documents by R-S. Sandhu et al., "Role-based access control models", IEEE Computer 29(2), pp. 38-47, 1996, and by A. Abou El Kalam et al., "Organization-based access control" 4th IEEE International Workshop on Policies for Distributed Systems and Networks, 2003.

Those models rely on the concept of an organization, and they serve to model a variety of security policies defined for and by that organization for accessing its resources.

Thus, more precisely, the OrBAC model introduces concepts of "roles", "activities", and "views" in order to define a security policy associated with an organization, in which:
- a role is a set of subjects to which the same security rules are applied;
- an activity is a set of actions to which the same security rules are applied; and
- a view is a set of objects to which the same security rules are applied.

Access to the resources of the organization is then controlled by specifying whether a role does or does not have permission to perform an activity on a view.

Although those models are particularly well adapted to representing the way access rights are distributed within an entity such as a business, and can thus be used effectively for managing access to relatively unchanging resources in conventional computer systems such as those presently in use in businesses, they are difficult to apply unchanged to cloud computing systems, and they are also found to be insufficient for taking account of the specific features of such systems.

Specifically, an essential characteristic of a cloud computing system is the way the resources that are allocated by the system to an entity can vary dynamically as a function of the needs of the entity.

Furthermore, such resources are allocated dynamically by the cloud computing system to the entity as such and not specifically to users: in other words, all of the users of the entity share all of the resources allocated to that entity.

It should also be observed that the way the entity itself is organized may also change while the entity is using the cloud computing system.

As a result, access to the resources of a cloud computing system cannot be limited to controlling access to those resources on the basis of rights as verified in the manner defined in the RBAC and OrBAC models as presently envisaged for managing conventional computer systems.

There therefore exists a need for a mechanism for managing access to resources made available by a cloud computing system that takes account of the above-mentioned features that are specific to systems of that type.

OBJECT AND SUMMARY OF THE INVENTION

The invention satisfies this need in particular by providing a method of managing access to a pool of computer and network resources made available by a cloud computing system to an entity having a plurality of users, the method comprising:
  an updating step:
    of updating a first model describing the pool of computer and network resources; and
    of updating a second model describing the entity, the second model being hierarchical and having a plurality of levels, each level of the second model having at least one element containing one or more users of the entity, each element of a hierarchical level being associated with an algorithm for allocating at least a portion of the pool of computer and network resources, the union of the elements of a hierarchical level containing all of the users of the entity;
  the updating step being performed in such a manner that the first model and the second model represent a current state of the pool of resources and a current state of the entity;
  on receiving a request from at least one user of the entity to access at least one resource of the pool of resources as specified in the request:
    an identification step of identifying resources for said at least one user from within the pool of resources, by applying resource allocation algorithms associated with the elements of the second model kept up to date with the current state of the pool of resources represented by the first model;
    a verification step of verifying compatibility between the resources identified for said at least one user and said at least one resource specified in the request; and
    a rejection step of rejecting the request in the event of incompatibility.

Correspondingly, the invention also provides a device for managing access to a pool of computer and network resources made available by a cloud computing system to an entity having a plurality of users, said device comprising:
  an updating module for:
    updating a first model describing the pool of computer and network resources; and
    updating a second model describing the entity, the second model being hierarchical and having a plurality of levels, each level of the second model having at least one element containing one or more users of the entity, each element of a hierarchical level being associated with an algorithm for allocating at least a portion of the pool of computer and network resources, the union of the elements of a hierarchical level containing all of the users of the entity;
  the updating module being configured so that the first model and the second model represent a current state of the pool of computer and network resources and a current state of the entity;
  a module activated on receiving a request from at least one user of the entity to access at least one resource of the pool of resources as specified in the request, the module comprising:
    a unit for identifying resources for said at least one user from within the pool of resources, the unit being suitable for applying allocation algorithms associated with the elements of the second model kept up to date with the current state of the pool of resources represented by the first model;
    a unit for verifying compatibility between the resources identified for said at least one user and said at least one resource specified in the request; and
    a unit for rejecting the activated request in the event of incompatibility.

The invention thus proposes dynamically managing access to computer and network resources made available to an entity by a cloud computing system, the method taking account of the current states of the resources and of the entity. As a result, the invention is well adapted to the features that are specific to cloud computing systems.

In order to take account of the way in which the computer and network resources that are made available to the entity by the computer system can vary as a function of demand, and also in order to take account of potential changes that might affect the entity, the invention proposes acting on each attempt by a user of the entity to access these resources, to verify the current (i.e. real) state of the resources for that user, given the policies defined within that entity for sharing resources between users.

This new degree of verification proposed by the invention serves to verify that the request from the user is compatible with the current state of the computer and network resources that are allocated to the entity by the cloud computing system (i.e. the state of the resources at the instant the request is received) and compatible with the intended way these resources are to be shared between the users of the entity.

For this purpose, the invention advantageously relies on various points, namely:
  defining and updating two models that describe respectively the set (also known as the "pool") of computer and network resources made available to the entity by the cloud computing system, and the hierarchical organization of the entity together with the rules (algorithms) applied within the entity at each hierarchical level concerning the way the resources that are allocated to the entity are to be shared among its users; and
  on receiving an access request from a user (or a group of users) for some or all of the resources, determining the current resources that it is possible to allocate to the user, by real-time application of the resource sharing rules defined within the entity for each hierarchical level to the current state of the pool of resources allocated to the entity, and verifying that the request from the user is compatible with the resources that it is possible to allocate to that user at the current instant.

In this way, it is ensured that an allocation or a reallocation of resources made available to the entity by the cloud computing system is indeed taken into account, and likewise that any change in the organization of the entity is also taken into account. Real-time application of algorithms for allocating or sharing resources in a manner that is defined within the entity also makes it possible to update the sharing of resources between users, given the current state of the pool of resources made available to the entity by the computer system.

Various resource allocation algorithms may be associated with an element of a hierarchical level of the second model, such as for example:

- an algorithm for equitable sharing of resources between elements of the hierarchical level; or
- an algorithm consisting in allocating a fixed portion of the resources to the element, with the resources that are not allocated to said element being shared among the other elements of the hierarchical level. Such an algorithm serves advantageously to establish priorities among the elements of each hierarchical level in terms of accessing the resources that are allocated to the entity.

These algorithms are particularly simple and fast to apply in real time.

Furthermore, they are a good match with the various alternatives that are generally envisaged in an organization or an entity such as a business for sharing resources among the users and the various sub-entities that make it up.

Naturally, other algorithms may be envisaged in a variant.

The resource allocation algorithms defined by and for the entity may be caused to change, in particular as a function of users being removed and/or added, or of elements or hierarchical levels being removed and/or added within the entity, or indeed of resources that are made available to the entity by the cloud computing system being removed and/or added.

It should be observed that the first and second models on which the invention relies are relatively generic, and are therefore flexible. They can easily be updated in order to represent any change that appears in the pool of computer and network resources and/or in the organization of the entity to which the pool is allocated. The term "organization of the entity" should be considered broadly herein, i.e. it includes not only adding or removing users and/or hierarchical levels within the entity, but also changes to the rules for sharing resources among the various users and/or hierarchical levels of the entity.

The first model provides an image and a description of the resources allocated to the entity and shared between the users. These resources are allocated to that entity only.

The hierarchical second model serves to go down to the level of individual users of the entity, which is particularly advantageous since access requests generally come from individuals, as contrasted with sub-entities (i.e. subdivisions or groups) of the entity.

The hierarchical structure of the second model makes it easy to create or remove users, types of user, or indeed groups of users.

It also makes it possible to establish hierarchical relationships in terms of access to resources between the entity, its sub-entities, and its users. Consequently, the second model does indeed represent the current organization of numerous businesses and it is consistent with the first model that is used for describing the pool of resources made available to the entity by the cloud computing system.

It may be observed that the invention is advantageously compatible with the extensible access control markup language (XACML) architecture defined by the internet engineering task force (IETF) standard (and used by the OrBAC access control model) for implementing access control in computer systems. This XACML architecture is based in known manner on five types of functional block, namely:

- a block for applying an access control policy, or policy enforcement point (PEP) block;
- a block for taking decisions in terms of access, or policy decision point (PDP) block;
- a repository containing access control policies (policy repository);
- a block in charge of managing information about access policies, or policy information point (PIP) block; and
- a block responsible for administering access policies, or policy administration point (PAP) block that specifies and manages access policies.

The invention thus seeks to extend the functions of the PIP and PDP blocks as defined in the XACML architecture so as to take account of information provided by the cloud computing system and so as to verify the availability of the resources as requested by the user.

The access control proposed by the invention is preferably combined with verifying the rights of the user to access the resource(s) as specified in the request.

Thus, in a particular implementation, the method further includes a step of verifying the right of said at least one user to access said at least one resource specified in the request, the request being rejected if said at least one user does not have the right to access said at least one resource.

The step of verifying access rights may advantageously be implemented before any application of resource allocation algorithms to the current states of the entity and of the pool of computer and network resources, and of making such application of resource allocation algorithms conditional, so as to avoid performing operations that would be pointless in the event of the user not having the right to access the requested resources.

By way of example, this step of verifying the access rights of the user may be implemented with the help of an OrBAC type mechanism that can easily be based on the second model.

In a particular implementation, each element of at least one hierarchical level in the hierarchical second model is associated with rights to access resources in the pool of resources, with the step of verifying access rights being performed on the basis of the updated hierarchical second model.

Furthermore, in another implementation, it is also possible, for at least one hierarchical level of the second model, to associate a role with each element of that level. The invention thus makes it possible to rely on the models defined by OrBAC, while ensuring that access to resources is managed in a manner that is flexible, dynamic, and adapted to the variability of the pool of resources allocated to the entity.

In a particular implementation, the first model describing the pool of computer and network resources is also a hierarchical model having a plurality of levels.

For example, it is possible to envisage a hierarchical level describing the virtual computer and network resources constituting the pool of resources allocated to the entity (e.g. storage space, computation power, network connectivity, etc.), and another hierarchical level describing the physical resources associated with those virtual resources (e.g. hard disks, servers, IP addresses, VLAN, etc.).

Such a model remains generic and is particularly flexible: it can easily be applied to various cloud computing usage contexts (e.g. for infrastructure as a service (IaaS) type resources, software as a service (SaaS) type resources, etc.).

Furthermore, it provides an overall view at various levels (virtual resources and associated physical resources) of the resources that are allocated to the entity.

In a particular implementation, the various steps of the management method are determined by computer program instructions.

Consequently, the invention also provides a computer program on a data medium, the program being suitable for being performed in a cloud computing system or more generally in a computer, the program including instructions adapted to performing steps of a management method as described above.

The program may use any programming language, and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In another aspect, the invention also provides a cloud computing system making available a pool of computer and network resources to an entity having a plurality of users, the system including a device of the invention for managing access to said pool of resources.

The computer system has the same advantages as those mentioned above for the management method and device of the invention.

In other embodiments, it is also possible to envisage that the management method, the management device, and the system of the invention presents in combination all or some of the above-specified characteristics.

BRIEF DESCRIPTION OF THE DRAWINGS

Other characteristics and advantages of the present invention appear from the following description made with reference to the accompanying drawings which show implementations having no limiting character.

In the figures:

FIGS. 3A and 3B show example hierarchical models respectively describing the pool of resources and the entity and suitable for use when implementing the invention;

FIGS. 5A and 5B are in the form of a flow chart showing the main steps of a management method implemented by the FIG. 1 management device.

DETAILED DESCRIPTION OF THE INVENTION

Figure 1:
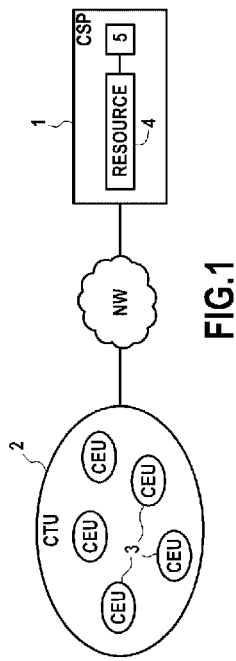
FIG. 1 is a diagram of a cloud computing system and a management device in accordance with the invention, in a particular embodiment.

FIG. 1 shows a cloud computing system in accordance with a particular embodiment of the invention in its environment.

In the example shown in FIG. 1, the system 1 is suitable for making a pool 4 of computer and network resources available to an entity 2 having a plurality of users 3, this pool of computer and network resources having the potential of varying over time as a function of demand from the users 3 of the entity 2 (e.g. more or fewer resources, adding new types of computer and network resources, etc.).

It is assumed at this point that the users 3 have computer terminals, such as laptop or desktop computers, personal assistants, etc., enabling them to access the computer and network resources of the pool 4, and to make use of them.

Access to the computer and network resources of the pool 4 by the users 3 of the entity 2 is managed by a management device 5 in accordance with the invention that is incorporated in the system 1.

By way of illustration, it is assumed at this point that the entity 2 is a business, and that the pool 4 of resources is made up of a variety of IaaS resources as defined in the document published by the ITU under the title "FG cloud TR, version 1.0—part 1: Introduction to the cloud ecosystem: definitions, taxonomies, use cases and high-level requirements", February 2012.

These IaaS resources of the pool 4 include in particular virtual resources such as computation power, storage spaces, and network connectivity services (e.g. a virtual local area network (LAN) access network (VLAN), a firewall, . . . ), and physical resources (e.g. hard disks, servers, etc.) associated with these virtual resources.

The pool 4 of resources is shared by all of the users 3 of the entity 2.

Naturally, the invention also applies to other types of entity or organization, and indeed to other categories of computer and network resources, such as for example software or application resources of the SaaS type.

The scenario envisaged in FIG. 1 relies on three main actors:

a cloud computing service provider (CSP) operating the cloud computing system 1 and providing virtual and pooled network and computer resources (including the pool 4 of computer and network resources) to various organizations or entities (such as the entity 2) via a telecommunications network NW (where NW may for example be the public Internet);

the entity 2, or "cloud tenant user" (CTU), which is a client of the computer system operator 1 for the pool 4 of resources; and the users 3 of the entity 2 known as "cloud end users" (CEUs), who are the final users of the resources of the pool 4 as purchased by the entity 2 from the cloud computing system operator 1, and who access these resources via their respective terminals.

This scenario is a conventional scenario in the cloud computing context.

As mentioned above, the device 5 of the system 1 is in charge of managing access to the computer and network resources made available to the entity 2 by the system 1, in other words to the resources of the pool 4.

In accordance with the invention, the access management implemented by the device 5 advantageously makes it possible to adapt to variations firstly in the pool 4 of computer and network resources, and secondly to the entity 2 and its organization.

In a cloud computing system such as the system 1, the resources made available to client entities are likely to vary as a function of demand from the users of those entities: thus, for example, the quantities of resources (e.g. storage space, computation power, etc.) made available to a given entity may go up or down depending on requests from the users sharing these resources, or in a variant, other types of resources may be added to the pool of resources in order to satisfy the users of the entity. The resources are said to be "auto-scaling": i.e. the cloud computing system is flexible and upgradable as a function of demand.

Likewise, the (typically hierarchical) organization of an entity may change while the system 1 is providing cloud computing service.

For example, when the entity is a business, it is possible that new departments might be created with specific computing and network needs in addition to the needs of the other departments of the business, or that new users may be incorporated in such-and-such a department of the business, etc.

Such changes in the organization of the entity have an impact in terms of management of the computer and network resources allocated to the entity, which may have effects that are not only quantitative, but that also involve access rights to the resources (distinct users or subgroups of the entity may have distinct access rights to the resources allocated to the entity).

Figure 2:
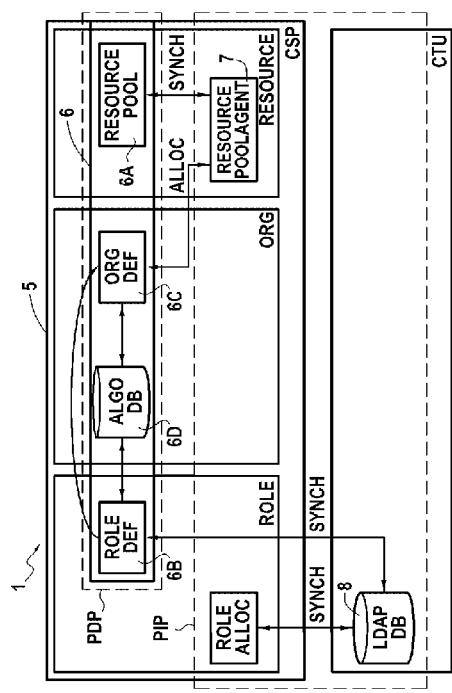
FIG. 2 is a diagram showing the functional architecture of the FIG. 1 management device.

FIG. 2 shows the functional architecture of the management device 5 provided in accordance with the invention to take account of potential changes in the pool 4 of resources and in the entity 2, in the presently-described embodiment.

More precisely, the management device 5 comprises:
 a module 6 for preparing and updating:
  a first model MOD1 describing the pool 4 of computer and network resources made available to the entity 2 by the computer system 1; and
  a second model MOD2 that is hierarchical with a plurality of levels describing the entity 2;
 the module 6 being configured in such a manner as to guarantee that the first model MOD1 and the second model MOD2 represent a current (or real) state respectively for the pool 4 of resources and for the entity 2; and
 a management module 7 that is activated on receiving a request from a user or a group of users of the entity 2 issued via a terminal to access one or more resources of the pool 4 as specified in the request. In the presently-described embodiment, this module 7 uses the models MOD1 and MOD2 as kept up to date by the module 6, firstly to verify that the user or the group of users originating the request is entitled to access the resource(s) specified in the request, and secondly that the request from the user or group of users is compatible with the resources for that user or group of users, given the rules defined by the entity 2 for sharing resources between its users.

In the example shown in FIG. 2, the updating module 6 relies on a unit 6A for defining the pool 4 of resources in order to prepare and keep up to date the first model MOD1 describing the pool 4 of computer and network resources.

In this embodiment, the first model MOD1 is a multi-level hierarchical model in which:

the root corresponds to the pool 4 properly speaking;
the lowest level (i.e. the level furthest away from the root) is constituted by low-level resources making up the pool 4 (e.g. hard disks, servers, etc.); and
the low-level resources are grouped together by resource type (e.g. storage, computation, network) in order to constitute hierarchical levels intermediate between the lowest level and the root.

An example of such a model is shown in FIG. 3A for a pool 4 of Iaas resources. The model MOD1 in this example has three hierarchical levels L1, L2, and L3:

the hierarchical level L1 is constituted by the root of the model, in other words by the pool 4 itself;
the hierarchical level L2 corresponds to the virtual resources of the pool 4: in this example it is constituted by a first element VCR corresponding to the virtual computation resources, and a second element VSR corresponding to the virtual storage resources, and a third element VNWR corresponding to the virtual resources associated with network connectivity. The union of these three elements contains all of the virtual computer and network resources of the pool 4 made available to the entity 2 by the computer system 1; and
the hierarchical level L3 corresponds to the physical resources of the pool 4: in this example it is constituted by a first element PCR corresponding to the physical resources dedicated to computation, a second element PSR corresponding to the physical resources dedicated to storage, and a third element PNWR corresponding to the physical resources dedicated to network connectivity. The union of these three elements constitutes all of the physical resources of the pool 4 made available to the entity 2 by the computer system 1.

Each element of the model MOD1 in this example is in the form of metadata. Each hierarchical level #i of the model MOD1 is associated with a table of elements, in which each element points to one or more elements of hierarchical level #i+1.

The model MOD1 is prepared and kept up to date by the unit 6A on the basis of information collected from the operator of the computer system 1 (including in particular a description of resources and a current state of those resources, in other words whether they are or are not allocated to the entity 2 at a given instant), e.g. via an application programming interface (API) type software interface.

It should be observed that the pool 4 is allocated at a given instant to a single entity, namely the entity 2, with all of the members of the entity 2 sharing the pool 4, i.e. all of the resources contained in the pool 4.

As mentioned above, the module 6 also prepares and keeps up to date the second model MOD2 that describes the entity 2. This second model MOD2 is a multi-level hierarchical model in which:

the root corresponds to the entity 2 properly speaking; and
the lowest level (i.e. the level furthest away from the root) is constituted by users belonging to the entity 2; and
the intermediate hierarchical levels represent the hierarchical organization of the entity 2 in terms of departments (or teams or groups in more general terms), and also in this example in terms of roles within those departments. Each hierarchical level is constituted by one or more elements, each element comprising one or more users of the entity 2, the union of the elements of a hierarchical level combining all of the users belonging to the entity 2.

It should be observed that each role defined in the hierarchical levels may have privileges that differ, in particular in terms of rights to access resources (i.e. as in the above-mentioned OrBAC model), or in terms of sharing the resources of the pool 4. Thus, in the presently-described implementation, each role is associated with access rights to specific resources of the pool 4 in conventional manner, e.g. in a manner similar to the OrBAC model. Naturally, these access rights may also vary over time and they are kept up to date by the module 6 on the basis of information collected from the entity 2.

Furthermore, in accordance with the invention, each element at each hierarchical level of the second model MOD2 is associated with a resource allocation algorithm, i.e. an algorithm for allocating some or all of the computer and network resources of the pool 4 allocated to the entity 2.

These algorithms serve to specify how the resources of the pool 4 are shared between the users 3 of the entity 2, and also at each hierarchical level of the model MOD2. Examples of such algorithms include in particular:

- an algorithm for equitable sharing of resources between elements of a specified hierarchical level known as the default resource allocation algorithm (DRAA); and/or
- an algorithm consisting in allocating a determined portion of the resources (determined absolutely or by percentage) to an element of a hierarchical level, with the resources that are not allocated to that element being shared between the other elements of the hierarchical level, which algorithm is also referred to as the static resource allocation algorithm (SRAA).

For simplification purposes, it is assumed herein that the entity 2 is associated by default with a DRAA algorithm, which amounts to allocating the entire pool 4 of resources thereto (since the entity is the only element belonging to the hierarchical level associated with the root of the model MOD2).

It should be observed that the model MOD2 is generic, and as a result it is particularly flexible. It can easily be modified in order to take account of changes that affect the entity 2 (e.g. that affect the hierarchical organization proper of the entity 2 (creating or eliminating a department, creating or eliminating a role), adding or removing users, or modifying algorithms for sharing resources allocated to the various elements of the model).

FIG. 3B shows an example of a model MOD2 describing the entity 2. In this example, the model MOD2 has four hierarchical levels L1, L2, L3, and L4 such that:

- the hierarchical level L1 is constituted by the root of the model, in other words the entity 2 itself;
- the hierarchical level L2 contains two elements, constituted respectively by the two departments DEPT1 and DEPT2 of the entity 2, each department having one or more users of the entity 2, and being associated with a DRAA type resource allocation algorithm;
- the hierarchical level L3 is made up of four elements, respectively describing different roles defined within the two departments DEPT1 and DEPT2. Thus the users of the departments DEPT1 and DEPT2 are organized in the example of FIG. 3B in two roles, namely a manager role (MGR1 and MGR2) and a role that is allocated to the remainder of staff (STAFF1 and STAFF2). The manager roles are associated with an SRAA type resource sharing algorithm while the remainder of the staff are associated with a DRAA type resource sharing algorithm. In other words, the managers MGR1 and MGR2 have priority in terms of resource allocation having a fixed portion of the resources allocated thereto (e.g. in this example 6 gigabytes (GB) of storage space); and
- the hierarchical level L4 is made up of the set of users 3 of the entity 2 (i.e. an element of L4 is a user of the entity 2), associated with the elements at hierarchical level L3. Thus, by way of example, the user M1 is a manager in the group of managers MGR1 of the department DEPT1 of the entity 2. In similar manner, the users S1-1, S1-2, . . . , S1-N of level L4 are staff members of the group STAFF1 of the department DEPT1 of the entity 2, etc. Each user is associated with a DRAA type resource sharing algorithm.

In other words, each element of a hierarchical level combines one or more users of the entity 2, and the union of elements of a given hierarchical level combines all of the users 3 of the entity 2.

In order to prepare and keep up to date the model MOD2, the module 6 relies on several units, namely:

- a unit 6B for defining roles within the entity 2;
- a unit 6C for defining the hierarchical organization of the entity 2; and
- a unit 6D for defining dynamic resource allocation algorithms applied among the various hierarchical levels and roles defined within the entity 2.

These units 6B, 6C, and 6D are informed by the entity 2, which provides a description of its hierarchical organization (including the concept of roles defined within each department) and resource allocation algorithms associated with each element at each hierarchical level, e.g. via an API type software interface.

Like the model MOD1, each element of the model MOD2 in this example is in the form of metadata, each hierarchical level #i of the model MOD2 being associated with a table of elements, in which each element points to one or more elements of hierarchical level #i+1.

The model MOD2 is kept up to date by the units 6B, 6C, and 6D on the basis of information collected from the entity 2, and in particular from a conventional lightweight directory access protocol (LDAP) type database 8 storing the definitions and the allocations of the roles. This database 8 is kept up to date by the entity 2 and is interrogated (or more generally use is made of the information it contains) by the units 6B, 6C, and 6D via the above-mentioned API software interface.

The updating module 6 and the module 7 for managing access to the pool 4 of computer and network resources made available by the system 1 are software modules in the presently-described embodiment.

Figure 4:
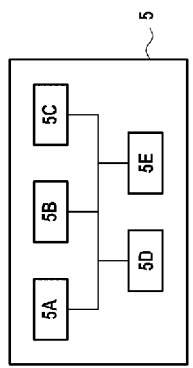
FIG. 4 is a diagram showing the hardware architecture of the FIG. 1 management device.

More precisely, in the presently-described embodiment, the management device 5 has the hardware architecture of a computer, as shown diagrammatically in FIG. 4. In particular, it comprises a processor 5A, a random access memory (RAM) 5B, a ROM 5C, a non-volatile flash memory 5D, and communications means 5E. These communications means 5E comprise in particular means for communicating with the entity 2 via the network NW (and in particular via the above-mentioned API), together with means for communication with the operator of the system 1 (also implementing an API as mentioned above).

The ROM 5C of the management device 5 constitutes a data medium in accordance with the invention that is readable by the processor 5A and that stores a computer program in accordance with the invention including instructions for executing steps of a management method in accordance with the invention as described below with reference to FIGS. 5A-5B and 6A-6B, in a particular implementation.

The management method of the invention is conducted in two main stages P1 and P2 that are implemented respectively by the modules 6 and 7 of the management device 5.

The stage P1 shown in FIG. 5A is a stage of the module 6 of the device 5 updating the models MOD1 and MOD2, and it takes place continuously or practically continuously so as to guarantee that, at all times, the models MOD1 and MOD2 are indeed representations of respectively a current state of the pool 4 of resources allocated to the entity 2 and a current state of the entity 2, i.e. that they represent the real states both of the pool 4 and of the entity 2.

For this purpose, these models are updated by the module 6 of the device 5 when a change is detected that affects the pool 4 of resources or the entity 2 (step E10).

A change may be detected in various ways.

Thus, by way of example, the module 6 of the device 5 may be notified by the entity 2 itself and/or by the operator of the computer system 1 that a change has taken place.

In a variant, the information contained in the models MOD1 and MOD2 may be synchronized periodically by the module 6 of the device 5 with the operator of the system 1 and with the entity 2 so as to detect a change that affects any of this information. The synchronization period should be selected so as to be short enough to ensure that when a user access request is received, current states are available both for the entity 2 and for the pool 4 of resources, i.e. states that correspond to their real states.

In another implementation, this updating may be performed on receiving a request from a user to access a resource of the pool 4.

Naturally, a combination of these variants could also be envisaged.

If the detected change affects the pool 4 of resources (response "yes" in step E20), the module 6 of the device 5 then updates the model MOD1 (step E30) on the basis of the information provided by the operator of the computer system 1 representing the current state of the pool 4. Such a change may occur in particular as a result of a reallocation of resources as a function of the needs of the entity 2 during an auto-scaling procedure.

If the detected change affects the entity 2 (response "yes" in step E40), the module 6 of the device 5 updates the model MOD2 (step E50) on the basis of the information provided by the entity 2 and representing its current state.

The stage P2 is an on-demand processing stage that is performed by the module 7 of the management device 5 on receiving a request to access at least a portion of the pool 4 of resources from a user or a group of users (e.g. a department, etc.) as issued via a terminal.

For simplification purposes, it is assumed that the request comes from a single user (e.g. the user S1-2 (FIG. 3B) of the entity 2) and relates to the virtual storage resource VSR of the pool 4. More precisely, it is assumed that the request issued by the user S1-2 via a terminal relates to that terminal accessing a space of 1.5 GB within the virtual resource VSR.

On receiving the access request from the user S1-2 (step F10), the module 7 begins by verifying the rights of the user S1-2 to access the storage specified in the request (test step F20).

In the presently-described implementation, and as mentioned above, these access rights are allocated as a function of the role of the user S1-2 within the entity 2, and more precisely within the department DEPT1.

The access control module 7 uses an OrBAC type mechanism to perform this verification, which mechanism is known to the person skilled in the art and not described in detail herein.

Naturally, other mechanisms for verifying the access rights of the user S1-2 may be envisaged in a variant.

In the presently-envisaged example, the user S1-2 is associated with the role STAFF1 identified in hierarchical level L3 of the model MOD2.

It is assumed that according to the model MOD2, each user associated with the role STAFF1 has the right to access the storage space VSR.

The module 7 thus determines that the user S1-2 has the right to use a terminal to access the storage space VSR and thus to access the resource specified in the request (response "yes" in test step F20).

Thereafter, the module 7 proceeds to identify the resources that can be allocated to the user S1-2, given the current state of the pool 4 of computer and network resources allocated to the entity 2.

Otherwise, if the user S1-2 is not authorized to use a terminal to access the storage space VSR (response no in test step F30), the module 7 rejects the access request form the user S1-2 (step F30).

In order to identify the computer and network resources that are available within the pool 4 for use by the user S1-2, the module 7 begins by determining the entity to which the user S1-2 belongs (specifically in this example the user S1-2 belongs to the entity 2), using conventional means (step F40).

Thereafter, the module applies the resource allocation algorithms associated with the various elements in the various hierarchical levels of the model MOD2 (step F50) to the current state of the pool 4 of resources allocated to the entity 2 and obtained from the model MOD1. Because the above-described stage P1 has been performed by the module 6, the models MOD1 and MOD2 used by the module 7 are representative of the current state of the pool 4 of resources and of the current state of the entity 2, at the moment when the request is received from the user S1-2.

Figure 6A:
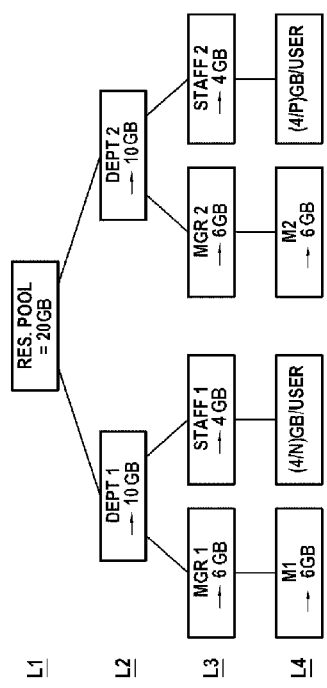
FIGS. 6A and 6B show examples of resources that can be allocated to various elements at different levels in the hierarchical model of FIG. 3B, for two distinct configurations of the pool of resources.

FIG. 6A shows the result of applying the algorithms of the model MOD2, shown in FIG. 3B, to the pool 4 of resources as represented by the model MOD1, when the model MOD1 of the pool 4 of resources indicates that a current virtual storage space VSR of 20 GB is allocated by the computer system 1 to the entity 2.

More precisely, for each hierarchical level of the model MOD2, the module 7 uses the resource allocation algorithms that are associated with the elements of the hierarchical level using the distribution specified in FIG. 3B. As a result, the module 7 finds out that:

- since the departments DEPT1 and DEPT2 are both associated with the DRAA algorithm, each of them shares 10 GB of the virtual storage resource VSR;
- since the managers MGR1 and MGR2 are both associated with an SRAA algorithm having a fixed portion of 6 GB, each of them shares 6 GB from among the 10 GB respectively allocated to the departments DEPT1 and DEPT2;
- the users of the entity 2 associated respectively with the role STAFF1 and with the role STAFF2 share equitably between them 4 GB in application of the DRAA algorithm;
- each of the managers M1 and M2 has 6 GB; and
- the users S1-1, . . . , S1-N (or respectively S2-1, . . . , S2-P) have allocated to each of them (4/N) GB (or respectively (4/P)) GB in application of the distribution specified by the DRAA algorithm.

It should be observed that in the presently-described implementation, and for reasons of simplification and savings in terms of computation, the resource allocation algorithms specified in the model MOD2 are applied solely to the VCR virtual resource of the pool 4. Naturally, it would also be possible to apply these algorithms to the VNWR and VCR virtual resources, however these are not concerned by the access request from the user S1-2 in the presently-described illustrative example.

In other words, as a function of the type of resources specified in the request and as a function of the description of the pool 4 of resources allocated to the entity 2, the allocation algorithms specified in the model MOD2 are applied in practice to some or all of the resources of the pool 4. Nevertheless, for simplification purposes, this step is specified solely in terms of applying the algorithms to the pool 4 of computer and network resources made available to the entity 2 by the computer system 1.

At the end of step F50 (FIG. 5B), the module 7 thus determines that (4/N) GB of storage space is available for the user S1-2, given the current state of the entity 2 of the pool 4 of resources.

Figure 6B:
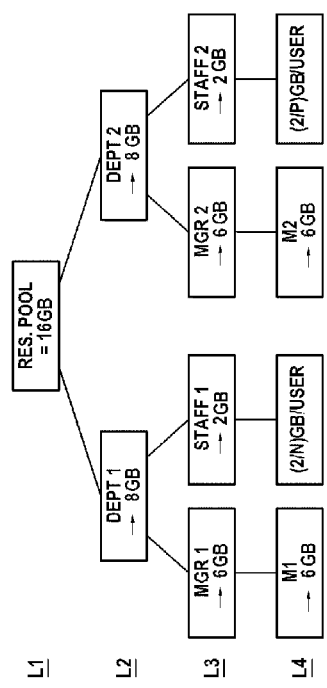

FIG. 6B shows the result of applying the allocation algorithms associated with the model MOD2 as shown in FIG. 3B to the pool 4 of resources represented by the model MOD1, when the model MOD1 of the pool 4 of resources indicates that a current virtual storage space VSR of 16 GB is allocated by the computer system 1 to the entity 2.

In this second example, the module 7 discovers at the end of step F50 that:
  each of the departments DEPT1 and DEPT2 shares 8 GB of the virtual storage resource VSR;
  the managers MGR1 and MGR2 each share 6 GB from the 8 GB allocated respectively to the departments DEPT1 and DEPT2;
  the users of the entity 2 associated with the role STAFF1 or the role STAFF2 share between them equitably 2 GB in application of the DRAA algorithm;
  the managers M1 and M2 each have 6 GB available; and
  each of the users S1-1, . . . , S1-N (or respectively S2-1, . . . , S2-P) has (2/N) GB (or respectively (2/P)) GB allocated thereto.

At the end of step F50, in this second example, the module 7 thus determines that (2/N) GB of storage space is reserved for the user S1-2.

The module 7 then verifies that the resources identified in step F50 are compatible with the resource specified in the request received from the user S1-2 namely 1.5 GB of storage space) (test step F60).

If the resources are compatible (in this example if the storage space specified in the request is smaller than the storage space reserved for the user S1-2 by the computer system 1, given the sharing algorithms specified among the users of entity 2) (response "yes" in test step F60), the request from the user S1-2 is accepted (step F70).

This applies in particular to the example shown in FIG. 6A, assuming that the number N is equal to 2. 2 GB are made available to the user S1-2 by the computer system 1 from the pool 4 of resources, whereas the user S1-2 is requesting only 1.5 GB in the request.

It should be observed that, for other requests, verifying compatibility of resources may take account of the actual utilization by a user of the resources that have been reserved for that user.

In contrast, if the resources are not compatible (e.g. the user is requesting storage space greater than the space reserved for that user), then the request from the user S1-2 is rejected (step F30).

This applies in particular to the example shown in FIG. 6B, assuming that the number N is equal to 2. 1 GB is made available to the user S1-2 by the computer system 1 from the pool 4 of resources, whereas the user S1-2 is requesting 1.5 GB. This rejection may be followed by a reallocation of greater storage space by the computer system 1 to the entity 2 in application of an auto-scaling process.

The invention thus makes it possible not only to manage rights to access resources made available to the users of the entity 2 by the computer system 1, but also makes it possible to manage the availability of these resources, which may vary over time, given the on-demand service made available by the computer system 1.

As mentioned above, the invention advantageously complies with the XACML reference functional architecture as defined by the IETF standard (and as used in particular by the OrBAC access control model), and as described in the documents RFC 2753 and RFC 3060 published by the IETF.

In this XACML architecture, the invention advantageously proposes extending the functions of PIP and PDP functional blocks so as to take account of the information provided by the cloud computing system and so as to verify the availability of the resources requested by the user, given the resource sharing specified by the entity 2 and given the current state of the pool 4 of resources allocated to the entity 2 by the cloud computing system.

The invention claimed is:

1. A method of managing access to a pool of computer and network resources made available by a cloud computing system to an entity having a plurality of users, the method comprising:
  an updating process:
    of updating a first model describing the pool of computer and network resources; and
    of updating a second model describing the entity, the second model being hierarchical and having a plurality of levels, each level of the second model having at least one element containing one or more users of the entity, each element of a said hierarchical level being associated with an algorithm for allocating at least a portion of the pool of resources, the union of the elements of a hierarchical level containing all of the users of the entity, wherein at least one algorithm for allocating at least a portion of the pool of resources associated with an element of a hierarchical level of the second model is an algorithm that allocates a fixed portion of the resources to said element, with the resources that are not allocated to said element being shared among the other elements of the hierarchical level;
  said updating process being performed in such a manner that the first model and the second model represent a current state of the pool of resources and a current state of the entity;
  on receiving a request from at least one user of the entity to access at least one resource of the pool of resources as specified in the request:
    an identification process of identifying resources for said at least one user from within the pool of resources, by applying resource allocation algorithms associated with the elements of the second model kept up to date with the current state of the pool of resources represented by the first model;
    a verification process of verifying compatibility between the resources identified for said at least one user and said at least one resource specified in the request; and
    a rejection process of rejecting the request in the event of incompatibility.

2. A method according to claim 1, further including a process of verifying the right of said at least one user to access said at least one resource specified in the request, the request being rejected if said at least one user does not have the right to access said resource.

3. A method according to claim 2, wherein the process of verifying access rights is performed with the help of an organization-based access control type mechanism.

4. A method according to claim 2, wherein, in the second hierarchical model, each element of at least one hierarchical level of the access rights is also associated with the resources of the pool of resources, with the process of verifying access rights being performed on the basis of the updated hierarchical second model.

5. A method according to claim 1, wherein, for at least one hierarchical level of the second model, a role is associated with each element at that level.

6. A method according to claim 1, wherein the first model describing the pool of computer and network resources is a hierarchical model having a plurality of levels.

7. A method according to claim 6, wherein, in the first model:
one hierarchical level describes virtual computer and network resources of the pool of resources; and
one hierarchical level describes physical computer and network resources of the pool of resources associated with the virtual resources.

8. A method according to claim 1, wherein another algorithm for allocating computer and network resources that is associated with an element of a hierarchical level of the second model is an algorithm for equitable sharing of resources between the elements of the hierarchical level.

9. A computer comprising a processor and a memory, the computer having stored thereon instructions which, when executed by the computer, cause the computer to perform a method of managing access to a pool of computer and network resources made available by a cloud computing system to an entity having a plurality of users, the method comprising:
an updating process:
of updating a first model describing the pool of computer and network resources; and
of updating a second model describing the entity, the second model being hierarchical and having a plurality of levels, each level of the second model having at least one element containing one or more users of the entity, each element of a said hierarchical level being associated with an algorithm for allocating at least a portion of the pool of resources, the union of the elements of a hierarchical level containing all of the users of the entity, wherein at least one algorithm for allocating at least a portion of the pool of resources associated with an element of a hierarchical level of the second model is an algorithm that allocates a fixed portion of the resources to said element, with the resources that are not allocated to said element being shared among the other elements of the hierarchical level;
said updating process being performed in such a manner that the first model and the second model represent a current state of the pool of resources and a current state of the entity;
on receiving a request from at least one user of the entity to access at least one resource of the pool of resources as specified in the request:
an identification process of identifying resources for said at least one user from within the pool of resources, by applying resource allocation algorithms associated with the elements of the second model kept up to date with the current state of the pool of resources represented by the first model;
a verification process of verifying compatibility between the resources identified for said at least one user and said at least one resource specified in the request; and
a rejection process of rejecting the request in the event of incompatibility.

10. A non-transitory computer readable data medium having stored thereon instructions for executing a method of managing access to a pool of computer and network resources made available by a cloud computing system to an entity having a plurality of users, the method comprising:
an updating process:
of updating a first model describing the pool of computer and network resources; and
of updating a second model describing the entity, the second model being hierarchical and having a plurality of levels, each level of the second model having at least one element containing one or more users of the entity, each element of a said hierarchical level being associated with an algorithm for allocating at least a portion of the pool of resources, the union of the elements of a hierarchical level containing all of the users of the entity, wherein at least one algorithm for allocating at least a portion of the pool of resources associated with an element of a hierarchical level of the second model is an algorithm that allocates a fixed portion of the resources to said element, with the resources that are not allocated to said element being shared among the other elements of the hierarchical level;
said updating process being performed in such a manner that the first model and the second model represent a current state of the pool of resources and a current state of the entity;
on receiving a request from at least one user of the entity to access at least one resource of the pool of resources as specified in the request:
an identification process of identifying resources for said at least one user from within the pool of resources, by applying resource allocation algorithms associated with the elements of the second model kept up to date with the current state of the pool of resources represented by the first model;
a verification process of verifying compatibility between the resources identified for said at least one user and said at least one resource specified in the request; and
a rejection process of rejecting the request in the event of incompatibility.

11. A device for managing access to a pool of computer and network resources made available by a cloud computing system to an entity having a plurality of users, said device comprising a processor and a memory, the processor configured to:
update a first model describing the pool of computer and network resources; and
update a second model describing the entity, the second model being hierarchical and having a plurality of levels, each level of the second model having at least one element containing one or more users of the entity, each element of a said hierarchical level being associated with an algorithm for allocating at least a portion of the pool of computer and network resources, the union of the elements of a hierarchical level containing all of the users of the entity, said device being configured so that the first model and the second model represent a current state of said pool of computer and network resources and a current state of the entity, wherein at least one algorithm for allocating at least a portion of the pool of resources associated with an element of a hierarchical level of the second model is an algorithm that allocates a fixed portion of the resources to said element, with the resources that are not allocated to said element being shared among the other elements of the hierarchical level; and on receiving a request from at least one user of the entity to access at least one resource of the pool of computer and network resources as specified in the request:

identify resources for said at least one user from within the pool of resources, the device configured to apply allocation algorithms associated with the elements of the second model kept up to date with the current state of the pool of resources represented by the first model;

verify compatibility between the resources identified for said at least one user and said at least one resource specified in the request; and in the event of incompatibility, reject said activated request.

12. A cloud computing system making available a pool of computer and network resources to an entity having a plurality of users, the system including a device according to claim 11 for managing access to said pool of resources.

\* \* \* \* \*